United States Patent [19]

Jeffs

[11] Patent Number: 4,800,103

[45] Date of Patent: Jan. 24, 1989

[54] INORGANIC FILLERS COATED WITH LATEX

[75] Inventor: David G. Jeffs, St. Austell, England

[73] Assignee: ECC International Limited, United Kingdom

[21] Appl. No.: 902,158

[22] Filed: Aug. 29, 1986

[30] Foreign Application Priority Data

Aug. 3, 1985 [GB] United Kingdom ............... 8521646

[51] Int. Cl.$^4$ .................. C08K 3/34; C08K 3/26; C08K 9/04; B32B 19/02
[52] U.S. Cl. ........................ 427/221; 523/205; 523/206; 523/209; 523/334; 523/342; 524/426; 524/430; 524/445; 524/447; 524/449; 524/451; 524/456
[58] Field of Search ............. 524/447, 445, 449, 451, 524/456, 430, ; 427/221, 222; 523/205, 206, 209, 342, 334

[56] References Cited

U.S. PATENT DOCUMENTS

| | | | |
|---|---|---|---|
| 2,123,482 | 7/1938 | de Jong | 523/342 |
| 2,644,772 | 7/1953 | Kaye | 427/221 |
| 3,068,185 | 12/1962 | Stamberger | 524/289 |
| 3,080,256 | 3/1963 | Bundy | 523/209 |
| 3,194,781 | 7/1965 | Hedberg et al. | 524/273 |
| 3,846,365 | 11/1974 | Berg et al. | 524/528 |
| 3,920,604 | 11/1975 | Berg et al. | 524/575 |
| 3,945,978 | 3/1976 | Berg et al. | 524/575 |
| 3,963,512 | 6/1976 | Swift et al. | 523/209 |
| 3,985,703 | 10/1976 | Ferry et al. | 523/342 |
| 3,985,704 | 10/1976 | Jones et al. | 523/342 |
| 3,992,558 | 11/1976 | Smith-Johannsen et al. | 427/221 |
| 4,017,452 | 4/1977 | Schwarz | 523/209 |
| 4,031,056 | 6/1977 | Patel et al. | 523/342 |
| 4,315,959 | 2/1982 | Buys et al. | 427/221 |
| 4,425,384 | 1/1984 | Brownscombe | 427/221 |
| 4,434,255 | 2/1984 | Charon | 523/209 |
| 4,483,886 | 11/1984 | Kowalski | 427/221 |

FOREIGN PATENT DOCUMENTS 1002824 1/1977 Canada ............... 427/221

*Primary Examiner*—Herbert J. Lilling
*Attorney, Agent, or Firm*—Stefan J. Klauber

[57] ABSTRACT

A process for preparing an inorganic filler comprising treating a particulate inorganic material with a natural or synthetic latex composition and dewatering and drying the resultant mixture. The surface-treated inorganic filler can be used with advantage in a polymeric resin composition.

3 Claims, No Drawings

INORGANIC FILLERS COATED WITH LATEX

This invention relates to inorganic fillers for use in polymeric resin compositions, and to a process for preparing such fillers.

BACKGROUND OF THE INVENTION

Inorganic fillers are commonly incorporated into polymeric resin compositions in order to modify the properties of the resin. For example, the use of a filler generally increases the rigidity and stiffness of a resin. However, most inorganic fillers have a naturally hydrophilic surface which is therefore not easily wetted by polymeric resin compositions which are generally hydrophobic, or oleophilic. This problem is especially acute when the resin is in the form of a low-viscosity liquid because under these conditions it is difficult to dissipate sufficient energy in the composition by mechanical agitation to effect dispersion of the inorganic filler in the polymeric resin. A further disadvantage of conventional inorganic fillers is that they generally have associated with them a small, but significant, quantity of water. Some thermosetting resins, such as nylon produced by polymerising caprolactam, contain as catalysts Grignard reagents which react preferentially with the water associated with the filler so that their efficiency in the resin composition is impaired. As little as 100 ppm of water on the filler can completely stop polymerisation. Polyurethane resin compositions generally contain diisocyanates which again react with any water which is present in the composition to evolve carbon dioxide and cause foaming in the composition. Other resin compositions may contain amine catalysts or cobalt salts, both of which are sensitive to any water which may be present and tend to be adsorbed onto the surface of an untreated inorganic filler.

SUMMARY OF THE INVENTION

According to one aspect of the present invention there is provided a process for preparing an inorganic filler which comprises treating a particulate inorganic material with a natural or synthetic latex composition and dewatering and drying the resultant mixture.

The particulate inorganic material may conveniently be a kaolinitic clay, such as kaolin or ball clay, a calcined kaolinitic clay, a calcium carbonate, wollastonite, bauxite, talc or mica. Preferably, substantially all the particles in the inorganic material are not larger than 0.100 mm.

The natural or synthetic latex composition may advantageously comprise an elastomer, for example a natural rubber or a natural rubber which has been substituted with functional groups, or a synthetic rubber such as a styrene butadiene rubber (SBR). Other suitable latices include those formed from certain elastomeric acrylic copolymers and non-elastomeric materials such as poly(vinyl acetate). The latex composition, which is a stabilised suspension of polymer particles in water, typically contains about 40% to 60% by weight of solids. The latex may be stabilised with the aid of a surfactant or a water-soluble colloid.

The particulate inorganic material may conveniently be treated with the latex by mixing the latex with an aqueous suspension containing from 5% to 50% by weight of the inorganic material, adding a water-soluble salt having a multivalent cation, and adjusting the pH of the suspension to more than 4.0 in order to coagulate the latex-treated material to form an open three-dimensional network of large flocs. The flocculated material is then dewatered, for example by filtration or by centrifugation, and the resultant cake is thermally dried to a substantially bone-dry state and the dry material pulverised. The quantity of the latex added is generally such as to provide from 1% to 10% by weight of latex solids, based on the weight of dry inorganic material. The water-soluble salt having a multivalent cation is preferably aluminium sulphate or aluminium chloride, but any other water-soluble salt having a cation of valency at last 2 could be used. The amount of the salt added is generally in the range of from 0.1% to 5.0% by weight, based on the weight of dry inorganic material. Most preferably the pH of the suspension is adjusted to within the range of from 7 to 9. The thermally dried material may conveniently be pulverised by means of an air-swept hammer mill such as, for example, an Atritor mill or a Raymond mill.

An alternative method of producing the latex-treated inorganic material comprises mixing sufficient of the latex to provide from 1% to 10% by weight of latex solids, based on the weight of dry inorganic material, with an aqueous suspension containing from about 40% by weight to about 85% by weight of the inorganic material and a suitable dispersing agent for the inorganic material. The resultant mixture is then dried in a spray dryer and, since the product of a spray dryer is generally in the form of hollow microspheres of dry material having a size of about 0.05 mm, the final pulverising step may be omitted.

According to another aspect of the present invention there is provided a polymeric resin composition which includes an inorganic filler prepared by the process of the present invention.

The surface-treated filler prepared by the process of the invention is found to be readily wettable by polymer compositions and disperses more easily in thermoplastic and thermosetting resins than an uncoated filler. For example, the treated filler may be fully dispersed in a given plastomeric resin composition with the expenditure of less mechanical energy in the mixing operation than is necessary with an untreated filler.

The surface-treated filler prepared by the process of the invention also remains completely dry even after being left in an atmosphere at 80% relative humidity for several days. The treated filler can therefore be used with caprolactam which is polymerised to a resin of the nylon type in the presence of a Grignard reagent as a catalyst. It can also be used in the presence of amine catalysts without reducing their efficiency since it does not adsorb the catalysts, and in the presence of the isocyanate component of a polyurethane resin composition without causing foaming. In thermosetting resins, such as polyesters, acrylics, phenolics, polyurethanes and nylons, the treated filler provides improved impact and tensile strength as compared with the untreated filler. It is believed that the small quantity of latex solids associated with the filler confers a toughening effect on the resin.

It is unexpected and surprising that an inorganic filler which has been surface treated in an aqueous system is hydrophobic to the extent of adsorbing substantially no water from the atmosphere. One skilled in the art would generally expect advantageous results only from a filler which had been surface treated with a hydrophobic material substantially in the absence of water.

EMBODIMENTS OF THE INVENTION

The invention is illustrated by the following Examples.

EXAMPLE 1

A polyurethane-modified acrylic thermosetting resin was prepared according to the following composition:

| Ingredient | Parts by weight |
| --- | --- |
| Polyurethane-modified acrylic monomer | 75 |
| Filler | 25 |
| Benzoyl peroxide | 0.9 |
| $N_1N_1$—dimethyl-p-toluidene | 0.19 |

The benzoyl peroxide was added as an initiator and was 50% by weight active. The $N_1N_1$-dimethyl p-toluidene was added as a catalyst.

Polymeric resin compositions having the above composition were prepared containing each of the following inorganic fillers:

(a) Paper filler-grade kaolin having a particle size distribution such that 9% by weight consisted of particles having an equivalent spherical diameter larger than 10 microns and 25% by weight consisted of particles having an equivalent spherical diameter smaller than 2 microns.

(b) Paper coating grade kaolin having a particle size distribution such that 0.2% by weight consisted of particles having an equivalent spherical diameter larger than 10 microns and 80% by weight consisted of particles having an equivalent spherical diameter smaller than 2 microns.

(c) Natural ground chalk having a particle size distribution such that 1% by weight consisted of particles having an equivalent spherical diameter larger than 10 microns and 86% by weight consisted of particles having an equivalent spherical diameter smaller than 2 microns.

(d) Micronised talc having a particle size distribution such that 0.1% by weight consisted of particles having an equivalent spherical diameter larger than 10 microns and 80% by weight consisted of particles having an equivalent spherical diameter smaller than 2 microns.

Each inorganic filler (a) to (d) was divided into two portions. The first portion was incorporated into a batch of the resin composition without further treatment, and the second portion was incorporated into a separate batch of the same resin composition after being surface treated with SBR in the following manner:

The inorganic filler was mixed with water to form an aqueous suspension containing 25% by weight of dry filler. There was then added to this suspension 10% by weight, based on the weight of dry filler, of a SBR latex containing 50% by weight of SBR solids and the mixture was stirred. The suspension was then coagulated by adding 2% by weight, based on the weight of dry filler, of hydrated aluminium sulphate. The pH of the suspension fell to 3.5 but was adjusted to a value within the range from 8 to 8.5 by adding sodium hydroxide solution. Large, open structure floccs were formed which were readily separated from the aqueous medium by filtration. The filter cake was dried at 80° C. for 16 hours and pulverised in a Raymond Mill to form a fine powder.

It was found that, in each case, the surface-treated filler was readily wetted by the resin composition and was rapidly drawn down into the body of the liquid composition, whereas the untreated filler remained floating on the surface of the resin composition for a considerable time and required the expenditure of much mechanical energy to effect complete dispersion of the filler in the composition.

It was also observed that the cure time required to form a hard resin was less when the surface-treated filler was used than when the filler was untreated. For example, the cure time for the resin with no filler present was 5 minutes but this increased to 6½ minutes when 25% by weight of untreated filler of type (a) above was added. When, however, the filler was surfacetreated type (a) the cure time was reduced to 4 minutes.

The hardened resins containing treated and untreated resins of types (a), (b), (c) and (d) were subjected to tests for flexural modulus, flexural yield, tensile strength, and notched and unnotched impact strength and the results obtained are set forth in Table 1. As a comparison a hardened resin prepared according to the formulation shown above except that the filler was omitted was also subjected to the same tests.

TABLE I

| Filler | Treated or untreated | Flexural modulus (MPa) | Flexural yield (MPa) | Tensile strength (MPa) | Impact strength Notched (KJ·m$^{-2}$) | Impact strength Unnotched (KJ·m$^{-2}$) |
| --- | --- | --- | --- | --- | --- | --- |
| None | — | 1326 | 87.1 | 46.3 | 0.93 | 15.79 |
| (a) Filler kaolin | Untreated | 2149 | 49.8 | 23.3 | 0.78 | 3.75 |
|  | Treated | 1866 | 56.4 | 30.5 | 0.92 | 4.37 |
| (b) Coating kaolin | Untreated | 2491 | 54.0 | 25.0 | 0.77 | 2.12 |
|  | Treated | 2057 | 51.9 | 25.7 | 0.80 | 2.54 |
| (c) Chalk | Untreated | 2084 | 39.6 | 26.6 | 0.74 | 2.20 |
|  | Treated | 2028 | 49.5 | 25.3 | 0.75 | 2.47 |
| (d) Talc | Untreated | 2260 | 44.7 | 30.5 | 0.80 | 2.63 |
|  | Treated | 2098 | 53.3 | 21.2 | 0.82 | 3.25 |

The tests were performed by the following methods laid down in British Standard Specification 2782: Part III

| | |
| --- | --- |
| Flexural modulus and flexural yield | Method 304C |
| Tensile strength | Method 301C |
| Notched impact strength | Method 306E |
| Unnotched impact strength | Method 306D |

EXAMPLE 2

A casting polyurethane resin having a 1:1 weight ratio of polyol-containing components to isocyanate-containing components and containing 20% by weight of filler was prepared by mixing the filler with the polyol portion and adding the isocyanate portion to the mixture.

Hardened resins were prepared containing treated and untreated fillers of types (b), (c) and (d) as described in Example 1.

A hardened resin of the same type but with no filler was also prepared and the resins were subjected to the same tests as in Example 1.

The results obtained are set forth in Table II below:

TABLE II

| Filler | Treated or untreated | Flexural modulus (MPa) | Flexural yield (MPa) | Tensile strength (MPa) | Impact Strength Notched (KJ · m$^{-2}$) | Impact Strength Unnotched (KJ · m$^{-2}$) |
|---|---|---|---|---|---|---|
| (a) None | — | 1049 | 50.8 | 35.8 | 1.64 | 10.87 |
| (b) Coating kaolin | Untreated | 1080 | 34.5 | 19.2 | 1.07 | 2.90 |
|  | Treated | 1117 | 35.5 | 19.0 | 1.00 | 3.99 |
| (c) Chalk | Untreated | 1239 | 33.1 | 18.8 | 0.90 | 3.00 |
|  | Treated | 1050 | 35.4 | 18.9 | 0.98 | 4.73 |
| (d) Talc | Untreated | 1122 | 29.6 | 16.0 | 0.77 | 3.50 |
|  | Treated | 1077 | 29.7 | 18.3 | 1.09 | 4.62 |

EXAMPLE 3

Batches of unsaturated polyester resin were prepared from a solution comprising 45% by weight of styrene and 55% by weight of a mixture of polyester monomers consisting essentially of about 50% by eight of propylene glycol, about 25% by weight of maleic anhydride and about 25% by weight of phthalic anhydride. Each batch was prepared by mixing together by means of a laboratory stirrer the solution of polyester monomers in styrene, 1% by weight based on the weight of polyester resin of cobalt octoate accelerator, and in the batches incorporating an inorganic filler 25% by weight of filler based on the weight of polyester resin. There was then added with continued stirring 2% by weight, based on the weight of polyester resin, of methyl ethyl ketone peroxide initiator.

Samples of each batch were injected into a mould designed to form square panels of dimensions 300 m × 300 mm × 3 mm and were cured at 25° C. for a gel time which varied from batch to batch plus an additional 30 minutes to allow the resin to harden. Each panel was then further cured for 3 hours in an oven at 80° C. before testing.

Five batches A to E were prepared in this way as follows:

Batch A: No inorganic filler

Batch B: The filler was a kaolinitic clay having a particle size distribution such that substantially all of the particles had an equivalent spherical diameter between 10 and 2 microns.

Batch C: The filler was the same kaolinitic clay as was used in Batch B but treated in accordance with the invention by mixing with an aqueous suspension containing 50% by weight of the clay and 0.1% by weight, based on the weight of dry clay, of a sodium polyacrylate dispersing agent, sufficient of the SBR latex used in Example 1 to provide 5% by weight of polymer solids on the dry clay. The resultant mixture was then spray dried in a spray drier to form hollow microspheres which were then pulverised to give a product substantially all of which was smaller than 20 microns diameter.

Batch D: The filler was a ground natural chalk having a particle size distribution such that 60% by weight of the particles had an equivalent spherical diameter smaller than 2 microns.

Batch E: The filler was the same ground chalk as was used in Batch D but treated in accordance with the invention by mixing with an aqueous suspension containing 60% by weight of the chalk and 0.1% by weight, based on the weight of dry chalk, of sodium polyacrylate dispersing agent sufficient of the SBR latex used in Example 1 to provide 5% by weight of polymer solids of the dry chalk. The mixture was then spray dried and pulverised as described for Batch C.

The gel time for each batch was recorded and the injection moulded panels were tested for surface gloss by measuring the percentage of incident light which was reflected or scattered back at two different angles to the perpendicular to the plane of the panel.

The colour of the panels was also measured by a system which is based on the formula known as the C.I.E. 1976 L* a* b* formula which was developed by the Commission Internationale d'Eclairage. Three measurements of the intensity of light reflected from the surface of the panel were made using Tristimulus X, Y and Z filters. (These are filters which each embrace a broad band of wavelengths in the visible spectrum but are generally red, green and blue in colour respectively). The measurements are made by means of an Elrepho reflectometer and L*, a* and b* values are calculated from the reflectance values for the X, Y and Z filters according to the formula:

$$L^* = 10\sqrt{Y},\ a^* = \frac{17.5\,(1.02X - Y)}{\sqrt{Y}},\ b^* = \frac{7.0\,(Y - 0.8467Z)}{\sqrt{Y}}$$

The a* and b* value can be said to be co-ordinates representing chromaticity (i.e. "redness", "yellowness" etc.) and the L* value can be said to represent the lightness or darkness of the shade. Of special interest is the difference in colour of the sample of the filled polymer composition from pure white (L*=100, a*=b*=0), and for this purpose there is calculated a colour difference ΔE which is given by:

$$\Delta E = [(\Delta L^*)^2 + (\Delta a^*)^2 + (\Delta b^*)^2]^{\frac{1}{2}}$$

where ΔL*, Δa* and Δb* represent the difference in the L*, a* and b* values of the sample from those of a pure white surface.

The results obtained are set forth in Table III below:

TABLE III

| | Gel time (min) | Gloss (%) at 20° | Gloss (%) at 60° | L* | a* | b* | ΔE |
|---|---|---|---|---|---|---|---|
| Batch A[1] | 15 | 34.5 | 80.0 | — | — | — | — |
| Batch B[1] | 32 | 7.2 | 42.9 | 36.0 | +1.2 | +9.2 | 64.7 |
| Batch C[2] | 6 | 23.5 | 63.5 | 65.3 | −0.1 | +14.8 | 37.7 |
| Batch D[1] | 15½ | 3.9 | 32.6 | 69.8 | +1.4 | +16.0 | 34.2 |

TABLE III-continued

| | Gel time (min) | Gloss (%) at 20° | 60° | L* | a* | b* | ΔE |
|---|---|---|---|---|---|---|---|
| Batch E[2] | 5½ | 24.6 | 64.3 | 81.5 | +0.7 | +11.6 | 21.9 |

[1]comparative
[2]invention

These results show that the use in a polyester composition of an inorganic filler treated in accordance with the invention give a shorter gel time and improved gloss and whiteness as compared with the untreated inorganic filler.

EXAMPLE 4

Nylon compositions were prepared by mixing together pellets of the nylon 66, Zytel E101, manufactured by the Du Pont company with 30% by weight, based on the weight of nylon, of an inorganic filler. The mixture was then compounded using a twin screw compounding extruder having screws of diameter 30 mm and samples for testing for flexural modulus, flexural yield strength, tensile yield strength and falling weight impact strength were prepared by injection into a tree mould at 300° C. The moulded samples were conditioned in boiling water for 1 hour and equilibrated at 20° C. and 50% RH until a constant weight of about 2.5% by weight of water based on the weight of dry nylon had been absorbed. The equilibration normally required from 7 to 10 days.

Two batches A and B were prepared as follows:

Batch A: This incorporated a conventional filler for nylon 66 which was a calcined kaolinitic clay having a particle size distribution such that 55% by weight of the particles had an equivalent spherical diameter smaller than 2 microns.

Batch B: The inorganic filler was the kaolinitic clay treated in accordance with the invention which was described in Example 3, Batch C.

The samples were tested for flexural modulus, flexural and tensile yield strength as indicated in Example 1 and for falling weight impact strength. The results obtained are set forth in Table IV below. The falling weight impact test was performed by means of a Yarsley falling weight impact tester in which a 5 Kg weight having a 20 mm hemispherical tup was allowed to fall through a height of 820 mm on to a nylon disc of diameter 100 mm and thickness 3 mm supported on a ring of internal diameter 40 mm. A transducer monitored the vertical deflection of the centre of the nylon disc with time after contact with the falling weight and the maximum deflection was recorded and the energy absorbed before rupture occurred was calculated.

TABLE IV

| | Flexural modulus (MPa) | Flexural yield (MPa) | Tensile strength (MPa) | Falling weight impact strength Deflection (mm) | Energy (J) |
|---|---|---|---|---|---|
| Batch A[1] | 953 | 59.2 | 36.4 | 16.7 | 23.2 |
| Batch B[2] | 1133 | 68.1 | 39.7 | 24.9 | >40 |

[1]comparative
[2]invention

The disc formed from nylon from Batch B did not rupture in the falling weight impact test.

EXAMPLE V

Polypropylene compositions were prepared by compounding together using a twin roll mill, steam heated at about 130° C., a polypropylene powder premix marketed by Imperial Chemical Industries PLC under the trade name PROPATHENE GW522M and various quantities of inorganic filler.

Samples required for the tensile strength test described under Method 301C of British Standard Specification 2782: Part III were prepared for injection moulding and were equilibrated at 20° C. and 50% RH for 7 days.

The two inorganic fillers used were:

A: The untreated kaolinitic clay described in Example 3, Batch B

B: The treated kaolinitic clay described in Example 3, Batch C

The results of the tensile tests performed on the different polypropylene compositions are set forth in Table V below:

TABLE V

| % by weight of filler based on weight of polypropylene | Tensile strength (MPa) Filler A untreated | Filler B treated |
|---|---|---|
| 20 | 40.2 | 41.1 |
| 30 | 40.2 | 41.5 |
| 40 | 38.2 | 41.0 |
| 50 | 36.1 | 40.2 |

I claim:

1. A process for preparing a coated inorganic filler which comprises adding to a particulate inorganic material selected from the group consisting of a kaolinitic clay, a calcined kaolinitic clay, a calcium carbonate, wollastonite, bauxite, talc, and mica, a natural or synthetic latex composition which comprises a suspension of polymer particles in water wherein the latex solids are selected from the group consisting of a natural rubber, a natural rubber which has been substituted with functional groups, a styrene butadiene rubber (SBR) and a poly(vinyl acetate), and dewatering and drying the resultant mixture, the amount of the natural or synthetic latex composition added being such as to provide from 1% to 10% by weight of latex solids based on the weight of dry inorganic material.

2. A process according to claim 1, wherein substantially all the particles in the inorganic material are not larger than 0.100 mm.

3. A process according to claim 1, wherein an aqueous suspension containing from 5% to 50% by weight of the inorganic material is mixed with a natural or synthetic latex composition containing from about 40% to about 60% by weight of solids, a water-soluble salt having a multi-valent cation is added to the resulting mixture, the pH of the resulting mixture is adjusted to a value greater than 4.0 to form flocs, the mixture containing the flocculated material is dewatered, and the dewatered solids are dried to a substantially bone-dry state.

* * * * *